(12) United States Patent
Sato et al.

(10) Patent No.: US 8,706,047 B2
(45) Date of Patent: Apr. 22, 2014

(54) MOBILE TERMINAL TESTER AND MOBILE TERMINAL TEST METHOD

(75) Inventors: Tsuyoshi Sato, Atsugi (JP); Isao Saikyo, Hadano (JP); Tayuna Nambu, Ebina (JP); Kenji Fujita, Yokosuka (JP); Junya Tanaka, Hadano (JP)

(73) Assignee: Anritsu Corporation, Atsugi-shi (JP)

( * ) Notice: Subject to any disclaimer, the term of this patent is extended or adjusted under 35 U.S.C. 154(b) by 763 days.

(21) Appl. No.: 12/613,133

(22) Filed: Nov. 5, 2009

(65) Prior Publication Data
US 2010/0120371 A1 May 13, 2010

(30) Foreign Application Priority Data
Nov. 10, 2008 (JP) ................... 2008-287797

(51) Int. Cl.
- H04B 17/00 (2006.01)
- H04B 3/46 (2006.01)
- H04Q 1/20 (2006.01)

(52) U.S. Cl.
USPC ............ 455/67.14; 455/67.11; 375/224

(58) Field of Classification Search
USPC ............ 455/550, 522, 66.1, 67.11, 67.12, 455/67.14, 69, 550.1, 115.1, 115.2; 375/224; 370/318
See application file for complete search history.

(56) References Cited

U.S. PATENT DOCUMENTS

| | | | | |
|---|---|---|---|---|
| 6,721,561 B1 * | 4/2004 | Jeong et al. | | 455/433 |
| 7,363,567 B2 * | 4/2008 | Rands | | 714/739 |
| 7,742,449 B2 * | 6/2010 | Matsuki | | 370/331 |
| 7,813,753 B2 * | 10/2010 | Santhanam | | 455/522 |
| 2005/0124349 A1 * | 6/2005 | Lin et al. | | 455/450 |
| 2005/0143062 A1 * | 6/2005 | Dowling | | 455/423 |
| 2006/0128373 A1 * | 6/2006 | Cochrane et al. | | 455/424 |
| 2007/0230356 A1 * | 10/2007 | Kalantri et al. | | 370/241 |
| 2008/0188215 A1 * | 8/2008 | Bergstrom et al. | | 455/424 |
| 2009/0209250 A1 * | 8/2009 | Huq | | 455/425 |
| 2009/0312005 A1 * | 12/2009 | Mukundan et al. | | 455/422.1 |

FOREIGN PATENT DOCUMENTS

| | | |
|---|---|---|
| JP | 2005-012274 | 1/2005 |
| JP | 2005-184294 | 7/2005 |
| JP | A 2006-101141 | 4/2006 |

OTHER PUBLICATIONS

Japanese Office Action dated Sep. 11, 2012 from corresponding Japanese Patent Application No. 2009-234398.

* cited by examiner

*Primary Examiner* — Andrew Wendell
(74) *Attorney, Agent, or Firm* — Greer Burns & Crain Ltd.

(57) ABSTRACT

The object of the present invention is to provide a mobile terminal tester which can reduce the production cost from that of the conventional mobile terminal tester. The mobile terminal tester according to the present invention comprises a plurality of base transceiver station simulators (10,11) for respectively simulating base transceiver stations by exchanging signals with a mobile terminal (2) to be tested; a base transceiver station information storage (13) for storing therein a plurality of types of base transceiver station information to have the base transceiver station simulators (10,11) function; a base transceiver station information setting section (14) for setting the base transceiver station information to the base transceiver station simulators (10,11); a transmission status setting section (15) for setting transmission status of each base transceiver station simulator (10,11); and a test process executing section (17) for executing each process of a test of the mobile terminal (2) by controlling the base transceiver station information setting section (14) and the transmission status setting section (15), in which the number of the types of the base transceiver station information stored in the base transceiver station information storage (13) is more than the number of the base transceiver station simulators (10,11).

6 Claims, 4 Drawing Sheets

Sequence Log

| Time Stamp | Direction | Message |
|---|---|---|
| 00:06:51 | | ------ Start Hard Handover Procedure from W-CDMA to W-CDMA ------ |
| | BTS1 | ==== W-CDMA Cell Information ==== |
| | | Band = Band I, DL Channel = 10563 (2112.6MHz), UL Channel = 9613 (1922.6MHz), PSC = 9, MCC=001, MNC=01F, LAC = 0, RAC = 128, NMO = NMO II, PacketRate = DL384k/UL64k, Packet Window Size = DL512/UL256, |
| | BTS2 | ==== W-CDMA Cell Information ==== |
| | | Band = Band I, DL Channel = 10700 (2140.0MHz), UL Channel = 9750 (1950.0MHz), PSC = 11, MCC=001, MNC=01F, LAC = 0, RAC = 130, NMO = NMO II, PacketRate = DLHS-Auto/ULHS-Auto, Packet Window Size = DL2047/UL2047, |
| | | ==== Test Parameter ==== |
| | | Test Pattern = Normal Case |
| | | ==== Power Control ==== |
| | | Change BTS1 DL Power from −20 dBm to −40 dBm step by 2 dB |
| | | Change BTS2 DL Power from −40 dBm to −20 dBm step by 2 dB |
| | | Interval Time = 1sec |
| | | ==== Measurement (W-CDMA)==== |
| | | Measurement = OFF |
| 00:06:52 | BTS1 | DL Power = −38dBm |
| 00:06:53 | BTS1 | DL Power = −36dBm |
| 00:06:54 | BTS1 | DL Power = −34dBm |
| 00:06:56 | BTS1 | DL Power = −32dBm |
| 00:06:57 | BTS1 | DL Power = −30dBm |
| 00:06:58 | BTS1 | DL Power = −28dBm |

MOBILE TERMINAL TESTER AND MOBILE TERMINAL TEST METHOD

BACKGROUND OF THE INVENTION

1. Field of the Invention

The present invention relates to a mobile terminal tester for and a mobile terminal test method of testing a mobile terminal capable of communicating with a base transceiver station in conformity with identical or different communication standards.

2. Description of the Related Art

There have so far been proposed a wide variety of mobile terminal testers for testing a mobile terminal capable of communicating with a base transceiver station in conformity with identical or different communication standards. One typical example of the conventional mobile terminal testers comprises at least one module of a base transceiver station simulator for exchanging various kinds of signals with the terminal to be tested, a display device having a screen for displaying icons each indicating the terminal and the base transceiver station simulator, an operation section operable to vary a distance on the screen of the display device between the icon indicative of the terminal and that of the base transceiver station simulator, and a transmission level controller for changing the transmission level of the transmission signal to be transmitted from the base transceiver station simulator to the terminal in response to the distance varied on the screen between the icon indicative of the terminal and that of the base transceiver station simulator. The conventional mobile terminal tester is designed to change the transmission level of the transmission signal to be transmitted from the base transceiver station simulator to the terminal in response to the distance varied on the display screen between the icon indicative of the terminal and that of the base transceiver station simulator. The conventional mobile terminal tester of this type is, for example, disclosed in Japanese Patent Laid-Open Publication 2006-101141.

The conventional mobile terminal tester, however, encounters such a problem that the production cost is increased in response to the number of the base transceiver station simulators for testing the terminal, resulting from the fact that the conventional mobile terminal tester not only needs many modules in accordance with the number of the base transceiver station simulators but also needs many interfaces to hold the modules thereinto.

SUMMARY OF THE INVENTION

It is, therefore, an object of the present invention to provide a mobile terminal tester which can reduce the production cost from that of the conventional mobile terminal tester.

According to a first aspect of the present invention, there is provided a mobile terminal tester comprising: a first base transceiver station simulator and a second base transceiver station simulator for respectively simulating base transceiver stations by exchanging signals with a mobile terminal (2) to be tested; a test process information storage for preliminarily storing therein test process information indicative of each process of a test of the mobile terminal in units of a test subject, the test of the mobile terminal being the test for simulating a situation that the mobile terminal sequentially moves through a communication area of a first base transceiver station, a communication area of a second base transceiver station, and a communication area of a third base transceiver station; a base transceiver station information storage (13) for preliminarily storing therein a first type of base transceiver station information for simulating the first base transceiver station, a second type of base transceiver station information for simulating the second base transceiver station, and a third type of base transceiver station information for simulating the third base transceiver station; a base transceiver station information setting section (14) for setting either one of the first type of base transceiver station information, the second type of base transceiver station information and the third e of base transceiver station information, respectively to the first base transceiver station simulator and the second base transceiver station simulator; a transmission status setting section (15) for setting transmission status of the first base transceiver station simulator and the second base transceiver station simulator; a test process executing section (17) for executing each process of a test of the mobile terminal by controlling the base transceiver station information setting section and the transmission status setting section and a determining section operative to determine test results of the mobile terminal, in which the test process executing section is operative to execute the processes which includes: controlling the base transceiver station information setting section to set the first type of the base transceiver station information to the first base transceiver station simulator; controlling the base transceiver station information setting section to set the second type of the base transceiver station information to the second base transceiver station simulator; controlling the transmission status setting section to set the transmission status of the first base transceiver station simulator to ensure that the mobile terminal is capable of communicating with the first base transceiver station simulator; controlling the transmission status setting section to set the transmission status of at least one of the first and second base transceiver station simulators to ensure that the mobile terminal is capable of communicating with the second base transceiver station simulator, after the mobile terminal and the first base transceiver station simulator are connected with each other; controlling the base transceiver station information setting section to set the third type of the base transceiver station information to the first base transceiver station simulator, after the determining section determines that the mobile terminal and the first base transceiver station simulator are disconnected and the mobile terminal and the second base transceiver station simulator are connected; and controlling the transmission status setting section to set the transmission status of at least one of the first and second base transceiver station simulators to ensure that the mobile terminal is capable of communicating with the first base transceiver station simulator.

In accordance with the above construction, the mobile terminal tester according to the present invention is designed to set the base transceiver station information and the transmission status to the base transceiver station simulators in each process of the test as needed, resulting in the fact that each base transceiver station simulator can simulate the plural base transceiver stations. The mobile terminal tester can, therefore, reduce the production cost from that of the conventional mobile terminal tester.

The mobile terminal tester according to the present invention may further comprises a test process information storage (16) for storing therein test process information indicative of each process of the test of the mobile terminal in units of a test subject, in which the test process executing section is operative to control the base transceiver station information setting section and the transmission status setting section in accordance with the test process information.

In accordance with the above construction, the mobile terminal tester according to the present invention can relieve a user from setting the base transceiver station information and the transmission status at the time of executing the test of the mobile terminal controlled to select the base transceiver station, resulting from the fact that the test process information is preliminarily prepared.

The base transceiver station information includes information indicative of communication standards. Each communication standard indicates one of wireless communication standards including a GSM (Global System for Mobile Communications) standard, a GSM/GPRS (Global System for Mobile Communications/General Packet Radio Service) standard, a W-CDMA (Wideband Code Division Multiple Access) standard, a CDMA2000 standard, a TD-SCDMA (Time Division-Synchronous Code Division Multiple Access) standard, an LTE (Long Term Evolution) standard, a WiMAX (Worldwide Interoperability for Microwave Access) standard and a Wi-Fi (Wireless Fidelity) standard.

In accordance with the above construction, the mobile terminal tester according to the present invention can test, for example, whether or not the mobile terminal can maintain the communication when moving through the communication areas of the plural base transceiver station in conformity with identical or different communication standards.

The transmission status setting section may be operative to set the transmission status of the base transceiver station simulator by changing a transmission power of the base transceiver station simulator.

In accordance with the above construction, the mobile terminal tester according to the present invention can test, for example, whether or not the mobile terminal is capable of maintaining the communication when moving through the communication areas of the plural base transceiver station.

The base transceiver station simulator may be operative to take two different states consisting of a barred state and a non-barred state, and the transmission status setting section may be operative to set the transmission status of the base transceiver station simulator by changing the base transceiver station simulator to take between the barred state and the non-barred state.

In accordance with the above construction, the mobile terminal tester according to the present invention can test whether or not the mobile terminal is capable of performing a position registration with targeting to the base transceiver station from the base transceiver station taking the barred state.

According to a second aspect of the present invention, there is provided a mobile terminal test method with using a mobile terminal tester having a plurality of base transceiver station simulators (10,11) for respectively simulating base transceiver stations by exchanging signals with a mobile terminal (2) to be tested and a base transceiver station information storage (13) for preliminarily storing therein more number of types of base transceiver station information than the base transceiver station simulators to have the base transceiver station simulators function, the base transceiver station information setting section controlled by the test process executing section is operative to obtain a specific type of the base transceiver station information from the base transceiver station information preliminarily stored in the base transceiver station information storage, and to set the specific type of the base transceiver station information to the base transceiver station simulator; the plurality of base transceiver station simulators including first and second base transceiver station simulators, and the base transceiver station information storage storing therein first to third types of the base transceiver station information, the mobile terminal test method including: setting the first type of the base transceiver station information to the first base transceiver station simulator; setting the second type of the base transceiver station information to the second base transceiver station simulator; setting the transmission status of the first base transceiver station simulator to ensure that the mobile terminal is capable of communicating with the first base transceiver station simulator; setting the transmission status of at least one of the first and second base transceiver station simulators to ensure that the mobile terminal is capable of communicating with the second base transceiver station simulator; setting the third type of the base transceiver station information to the first base transceiver station simulator; and setting the transmission status of at least one of the first and second base transceiver station simulators to ensure that the mobile terminal is capable of communicating with the first base transceiver station simulator.

The mobile terminal test method according to the present invention sets the base transceiver station information and the transmission status to the base transceiver station simulators in each process of the test as needed, resulting in the fact that each base transceiver station simulator can simulate the plural base transceiver stations. The mobile terminal test method can, therefore, reduce the production cost from that of the conventional mobile terminal tester.

BRIEF DESCRIPTION OF THE DRAWINGS

The features and advantages of the mobile terminal tester according to the present invention will more clearly be understood from the following description taken in conjunction with the accompanying drawings in which.

DESCRIPTION OF THE EMBODIMENTS

The preferred embodiment of the present invention will be described hereinafter with reference to the drawings.

Figure 1:
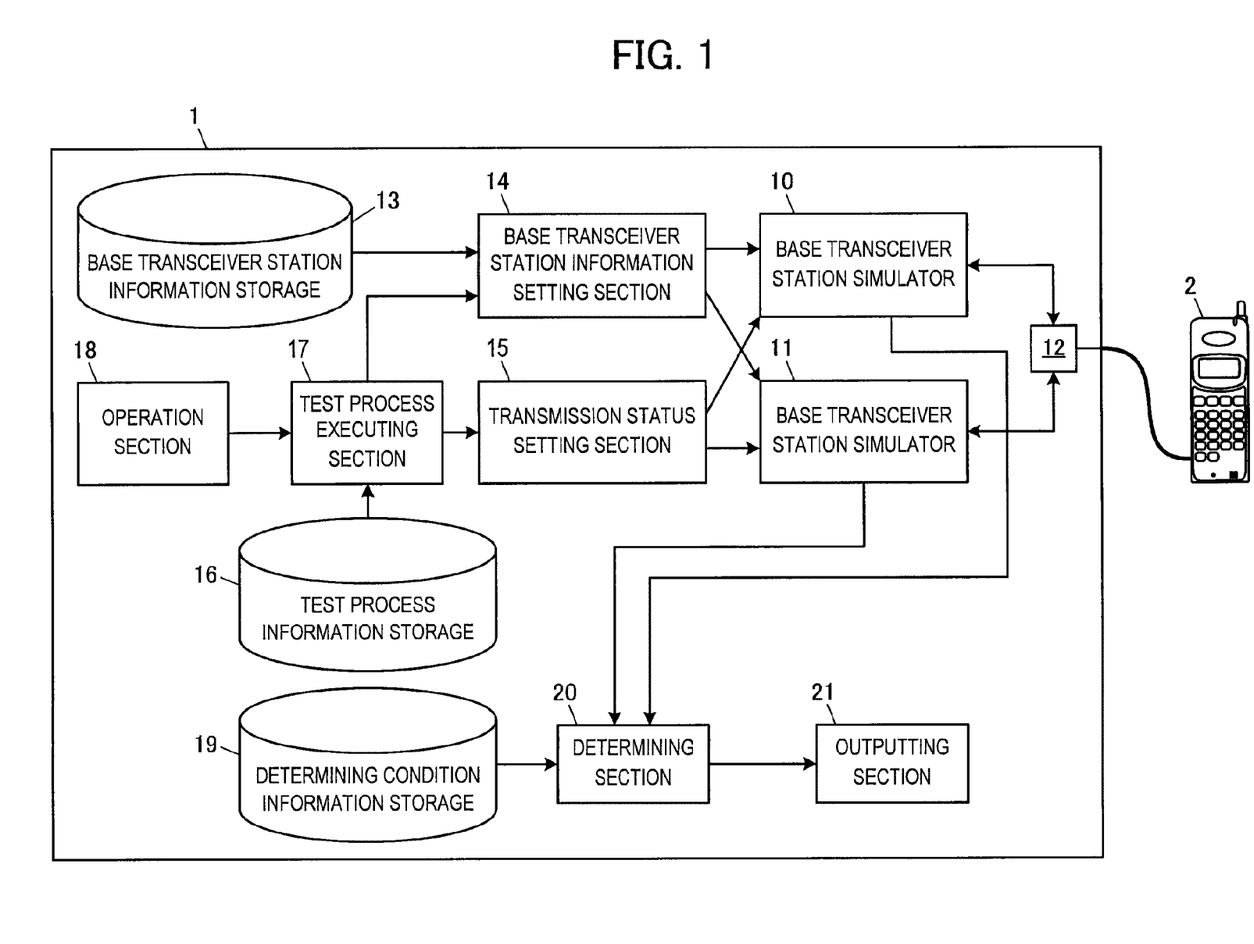
FIG. 1 is a block diagram showing a preferred embodiment of the mobile terminal tester according to the present invention.

As shown in FIG. 1, the mobile terminal tester 1 according to the preferred embodiment of the present invention comprises base transceiver station simulators 10, 11 for respectively simulating base transceiver stations exchanging signals with a mobile terminal 2 to be tested, and a coupling and splitting device 12 for coupling and splitting the signals to be exchanged between the base transceiver station simulators 10, 11 and the mobile terminal 2.

The mobile terminal tester 1 further comprises a base transceiver station information storage 13 for storing therein a plurality of types of base transceiver station information to have the base transceiver station simulators 10, 11 function, a base transceiver station information setting section 14 for setting the base transceiver station information to the base transceiver station simulators 10, 11, a transmission status setting section 15 for setting transmission status of each base transceiver station simulator 10, 11, and a test process information storage 16 for storing therein test process information indicative of each process of the test of the mobile terminal 2. The test process information is stored in the test process information storage 16 in units of a test subject.

The mobile terminal tester 1 further comprises a test process executing section 17 for executing each process of the test of the mobile terminal 2 by controlling the base transceiver station information setting section 14 and the transmission status setting section 15, an operation section 18 operable to specify the test subject of the mobile terminal 2 to the test process executing section 17, a determining condition information storage 19 for storing therein determining condition information indicative of a determining condition to determine test results of the mobile terminal 2, a determining section 20 for determining the test results of the mobile terminal 2, and an outputting section 21 for outputting the test results determined by the determining section 20.

Although the mobile terminal tester 1 comprises the two base transceiver station simulators 10, 11 in FIG. 1, it is not intended to limit the number of the base transceiver station simulators constituting the mobile terminal tester according to the present invention.

While the mobile terminal tester 1 is designed to exchanges the signals with the mobile terminal 2 by wired connections, for example, via a coaxial cable in FIG. 1, the mobile terminal tester 1 may further comprise an antenna for exchanging the signals with the mobile terminal 2 by wireless connections according to the present invention.

The base transceiver station information storage 13 is constituted by an involatile storage media such as, for example, a hard disk device and a flash memory. The base transceiver station information storage 13 preliminarily stores therein the plurality of types of the base transceiver station information. The base transceiver station information includes parameters each indicating a communication standard, a version capable of supporting the communication standard, a country code, a carrier code, communication frequencies of respective up and down links, a transmission rate, a communication area, and a scrambling code.

Each of the communication standards indicates one of wireless communication standards including, for example, a GSM standard, a GSM/GPRS standard, a W-CDMA standard, a CDMA2000 standard, a TD-SCDMA standard, an LTE standard, a WiMAX standard and a Wi-Fi standard.

The number of the types of the base transceiver station information stored in the base transceiver station information storage 13 is more than the number of the base transceiver station simulators 10, 11. In other words, the base transceiver station information storage 13 stores three or more types of the base transceiver station information in this embodiment.

The term "type" herein described is intended to indicate a unit of the base transceiver station information to be set to each base transceiver station simulator 10, 11. In other words, one type of the base transceiver station information is needed by one base transceiver station simulator to function.

The base transceiver station information setting section 14, the transmission status setting section 15, the test process executing section 17 and the determining section 20 are each constituted by a processor such as, for example, a CPU (Central Processing Unit).

The base transceiver station information setting section 14 is operative to set the base transceiver station information stored in the base transceiver station information storage 13 to each base transceiver station simulator 10, 11 on the basis of instructions from the test process executing section 17. Each of the base transceiver station simulators 10, 11 updated with the base transceiver station information is adapted to simulate a different base transceiver station from the base transceiver station simulated before updated.

The test process information storage 16 is constituted by the involatile storage media, as with the base transceiver station information storage 13. The test process information storage 16 preliminarily stores therein the test process information in units of the test subject.

The test subject represents, for example, a cell selection test, a cell reselection test or a handover test. The cell selection test is executed to confirm whether or not the mobile terminal 2 is capable of selecting the most suitable cell, i.e., the most suitable base transceiver station at the time of performing a position registration for using a network.

The mobile terminal 2 might be located within an environment that receives radio waves from the plural base transceiver stations in different countries near the country border, for example, in Europe where many countries are in contact with one another on land. The cell selection test is executed to confirm whether or not the mobile terminal 2 powered on within the environment is capable of performing the position registration with targeting to the base transceiver station only in a specified country. The cell selection test is also executed to confirm whether or not the mobile terminal 2 is capable of selecting the preferential carrier and country.

The cell selection test simulates not only the situation in which the mobile terminal 2 is powered on, but also a situation in which the mobile terminal 2 is moved from the inside of a tunnel or a building where the mobile terminal 2 can not receive the radio waves to the outside where the mobile terminal 2 can receive the radio waves.

The cell reselection test is executed to confirm whether or not the position-registered mobile terminal 2 is capable of selecting the most suitable cell at the time of detecting the most suitable cell in response to the variance of a wireless environment under the state that the mobile terminal 2 is not provided with a service such as, for example, a voice communication and a packet communication. In the cell reselection, the variance of the wireless environment includes such as, for example, the variance of a reception level and the variance of a state of the base transceiver station. The base transceiver station is operative to take two different states consisting of a barred state and a non-barred state.

The base transceiver station is operative to take the barred state in case that the number of the position-registered mobile terminals is more than a specified barred number, in case that the base transceiver station has failures occur therein, or in case that the base transceiver station is not to be used, for example, by a maintenance.

The barred state is indicated by information included broadcast information. The broadcast information is obtained by the mobile terminal 2 from the base transceiver station in response to a reload request (Paging) signal transmitted by the base transceiver station to the position-registered mobile terminal when the base transceiver station takes the barred state. The broadcast information is also broadcasted periodically by the base transceiver station.

The handover test is executed to confirm whether or not the mobile terminal 2 provided by one cell with the service such as, for example, the voice communication and the packet communication is capable of selecting the most suitable cell at the time of detecting in response to the variance of the wireless environment. In the handover, the variance of the wireless environment includes such as, for example, the variance of the reception level.

The handover, in general, indicates a hard handover having an instantaneous interruption occurred in a predetermined time interval. Depending on the standard, the handover, however, indicates a soft handover making the mobile terminal 2 briefly communicate with two base transceiver stations.

The operation section 18 is constituted by an input device such as, for example, a keyboard device and a pointing device. The operation section 18 is adapted to be inputted thereto the test subject of the mobile terminal 2 and the combination of the test subjects. The operation section 18 is operative to make the test process executing section 17 execute each process of the test in accordance with the test process information corresponding to the test subject inputted thereto.

The test process executing section 17 is operative to control the base transceiver station information setting section 14 and the transmission status setting section 15 to execute the test specified by the operation section 18 in accordance with the test process indicated by the test process information.

These test determine the results by confirming the determining condition representing that: an error rate of communication data and a quality of voice each meets a predetermined standard; a quality of a video phone meets a predetermined standard; an application continuously executing the packet communication can correctly operate; and a message service such as, for example, an SMS (Short Message Service), an EMS (Enhanced Message Service) and an MMS (Multimedia Messaging Service) correctly serves.

The information indicative of the determining condition is preliminarily stored in the determining condition information storage 19. The determining condition information storage 19 is constituted by the involatile storage media, as with the base transceiver station information storage 13. The determining section 20 is operative to determine the test results of the mobile terminal 2 by comparing the response of the mobile terminal 2 from the base transceiver station simulators 10, 11 with the determining condition indicated by the information stored in the determining condition information storage 19.

The outputting section 21 is constituted by a display device. The outputting section 21 is adapted to display the test results determined by the determining section 20.

Figure 2:
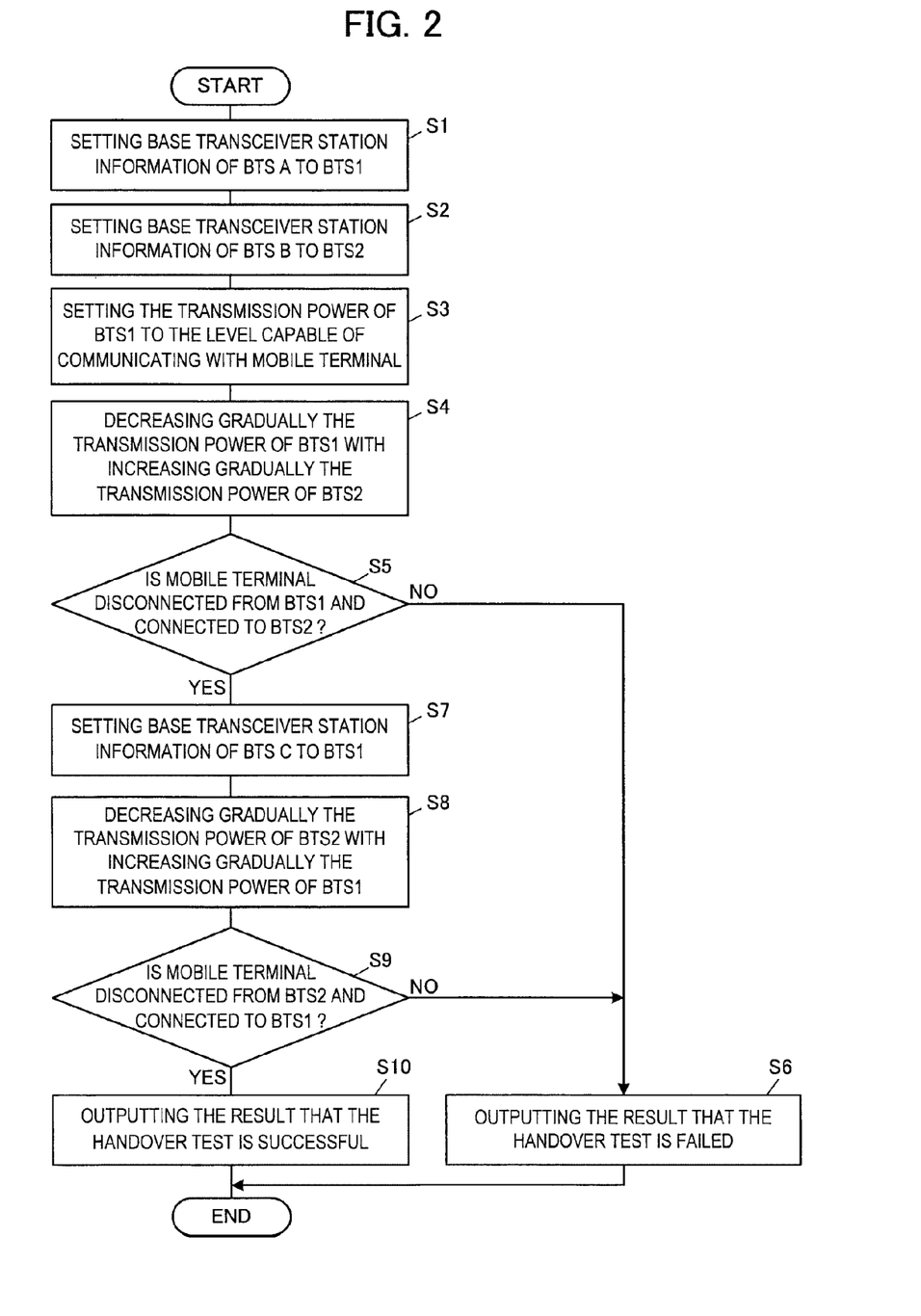
FIG. 2 is a flow chart showing a handover test operation of the preferred embodiment of the mobile terminal tester according to the present invention.

The operation of the mobile terminal tester 1 thus constructed above mentioned will be described hereinafter with reference to the drawings in particular to FIGS. 2 to 4. The handover test operation is operated in accordance with the test subject specified by the operation section 18. FIG. 2 shows one example of the handover test operation in case that the test subject is specified by the operation section 18 to execute the processes of: setting the base transceiver station simulator 10 as one base transceiver station (hereinafter simply referred to as "BTS A"); setting the base transceiver station simulator 11 as other base transceiver station (different from the BTS A, and hereinafter simply referred to as "BTS B"); executing the handover test from the BTS A to the BTS B; setting the base transceiver station simulator 10 as other base transceiver station (different from the BTS A and the BTS B, and hereinafter simply referred to as "BTS C"); and executing the handover test from the BTS B to the BTS C.

When the test subject is specified by the operation section 18, the test process information corresponding to the specified test subject is obtained by the test process executing section 17 from the test process information storage 16. The test process executing section 17 operates in accordance with the obtained test process information.

The base transceiver station information setting section 14 is firstly controlled by the test process executing section 17 to obtain the base transceiver station information of the BTS A from the base transceiver station information storage 13, and to set the obtained base transceiver station information to the base transceiver station simulator 10 (simply referred to as "BTS1"), in the step S1.

The base transceiver station information setting section 14 is then controlled by the test process executing section 17 to obtain the base transceiver station information of the BTS B from the base transceiver station information storage 13, and to set the obtained base transceiver station information to the base transceiver station simulator 11 (simply referred to as "BTS2"), in the step S2.

The transmission status setting section 15 is then controlled by the test process executing section 17 to set a transmission power of the BTS1 to the level capable of communicating with the mobile terminal 2, in the step S3. The mobile terminal 2 and the BTS1 are then connected with each other.

The transmission status setting section 15 is then controlled by the test process executing section 17 to decrease gradually the transmission power of the BTS1 with increasing gradually the transmission power of the BTS2, in the step S4.

The determining condition indicated by the determining condition information stored in the determining condition information storage 19 is then determined by the determining section 20 to be met or not, in the step S5. In this embodiment, the determining condition represents that the mobile terminal 2 and the BTS1 are disconnected and the mobile terminal 2 and the BTS2 are connected.

In case that the mobile terminal 2 and the BTS1 are not disconnected or the mobile terminal 2 and the BTS2 are not connected, the determining section 20 outputs the result to the outputting section 21 about the fact that the handover test from the BTS A to the BTS B is failed, in the step S6, and the handover test operation is ended.

Meanwhile, in case that the mobile terminal 2 and the BTS1 are disconnected and the mobile terminal 2 and the BTS2 are connected, the base transceiver station information setting section 14 is then controlled by the test process executing section 17 to obtain the base transceiver station information of the BTS C from the base transceiver station information storage 13, and to set the obtained base transceiver station information to the BTS1, in the step S7.

The transmission status setting section 15 is then controlled by the test process executing section 17 to increase gradually the transmission power of the BTS1 with decreasing gradually the transmission power of the BTS2, in the step S8.

The determining condition indicated by the determining condition information stored in the determining condition information storage 19 is then determined by the determining section 20 to be met or not, in the step S9. In this embodiment, the determining condition represents that the mobile terminal 2 and the BTS2 are disconnected and the mobile terminal 2 and the BTS1 are connected.

In case that the mobile terminal 2 and the BTS2 are not disconnected or the mobile terminal 2 and the BTS1 are not connected, the determining section 20 outputs the result to the outputting section 21 about the fact that the handover test from the BTS B to the BTS C is failed, in the step S6, and the handover test operation is ended.

Meanwhile, in case that the mobile terminal 2 and the BTS2 are disconnected and the mobile terminal 2 and the BTS1 are connected, the determining section 20 outputs the result to the outputting section 21 about the fact that the handover test from the BTS A to the BTS C via the BTS B is successful, in the step S10, and the handover test operation is ended.

Figure 3:
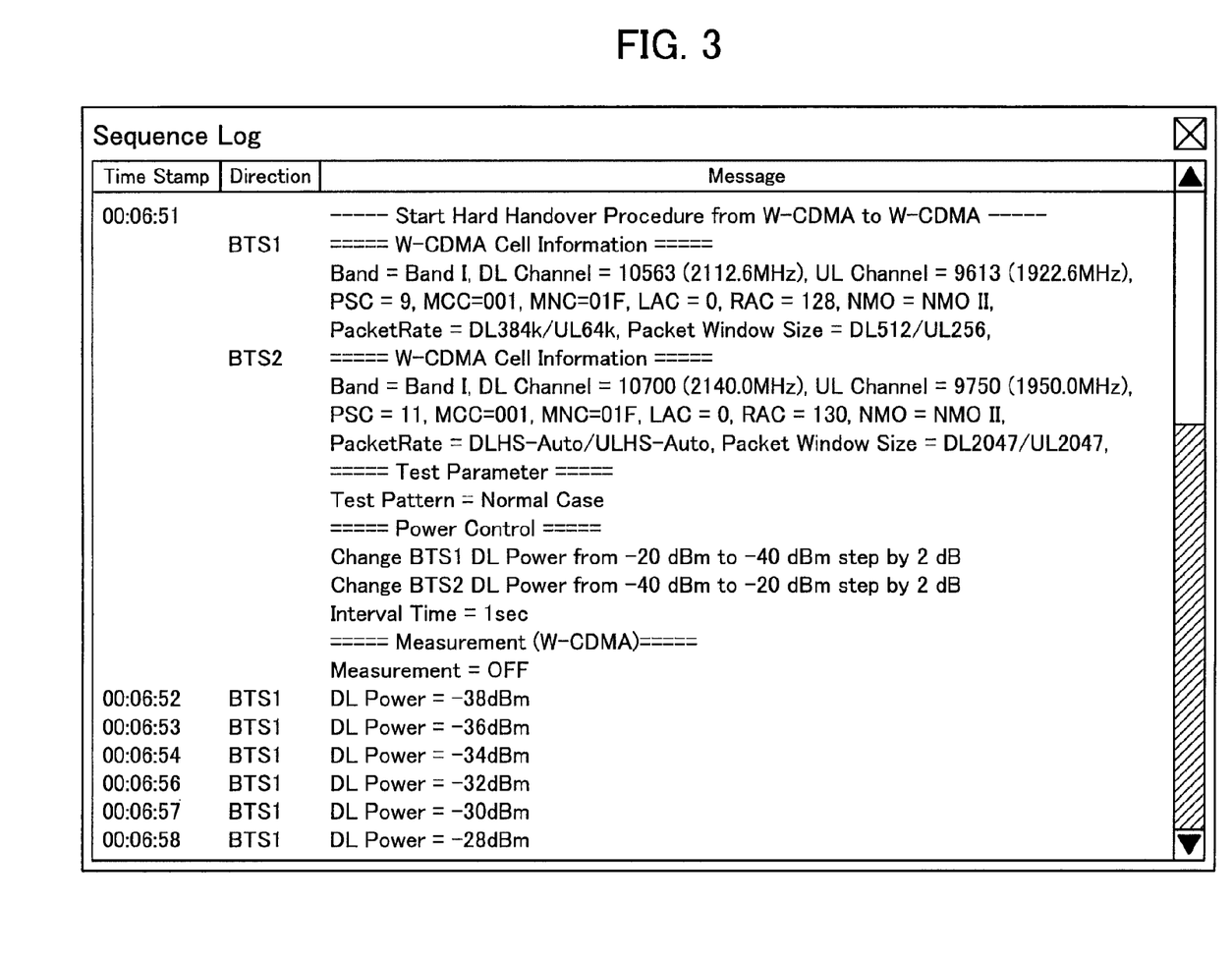
FIG. 3 is a conceptual diagram showing an output example of an outputting section constituting the preferred embodiment of the mobile terminal tester according to the present invention.

When each process of the test subject specified by the operation section 18 is executed as described above, the result of each process is displayed as log information by the outputting section 21 as shown in FIG. 3.

The log information shown in FIG. 3 will be described hereinafter. The segment displayed in an upper portion will be firstly described hereinafter. The term "Time Stamp" is intended to indicate a time of occurrence of an event. The term "Direction" is intended to indicate a site where the event occurs or a site corresponding to the event. The term "Message" is intended to indicate contents of the event.

Each message will be then described hereinafter. The line 1 of the message represents the start of the handover test forcing to execute the handover between the base transceiver stations each conforming to the W-CDMA standard at the Time Stamp=00:06:51. The line 2 and the following lines represent the states and test conditions of the respective BTS1 and BTS2 in this test.

The lines 2 to 5 represent the setting of the BTS1. The term "Band" is intended to indicate a setting of usable frequency band information. The set value of "Band I" represents a frequency band named "I" in the plural frequency bands.

The term "DL Channel" is intended to indicate a carrier frequency of the down link. The set value of "10563" is a specified value in the standard, and represents the carrier frequency=2112.6 MHz. The term "UL Channel" is intended to indicate the carrier frequency of the up link. The set value of "9613" is a specified value in the standard, and represents the carrier frequency=1922.6 MHz.

The term "PSC" is an abbreviation of "Primary Scrambling Code", and is intended to indicate a number of a spread code. The term "MCC" is an abbreviation of "Mobile Country Code", and is intended to indicate a country code for identifying the country. The set value of "001" represents a test code.

The term "MNC" is an abbreviation of "Mobile Network Code", and is intended to indicate a code for identifying the carrier. The term "LAC" is an abbreviation of "Location Area Code", and is intended to indicate a code of the position in a circuit switching network system. The term "RAC" is an abbreviation of "Routing Area Code", and is intended to indicate a code of the position in a packet switching network system.

The term "NMO" is an abbreviation of "Network Mode of Operation", and is intended to indicate information indicative of a specification for an operation of the network. The term "PacketRate" is intended to indicate a transmission speed. The set value of "DL384k/UL64k" represents that the transmission speed of the down link is 384 kbps and that of the up link is 64 kbps. The term "Packet Window Size" is intended to indicate a widow size of the packet.

The lines 6 to 9 represent the setting of the BTS2. Each setting of the BTS2 is omitted to be described hereinafter, resulting from the fact that each setting of the BTS2 is shown by the same manner as that of BTS1.

The lines 10 and 11 represent one of a normal case or an abnormal case confirmed by this test. In the line 11, the set value of "Normal Case" represents the normal case confirmed by this test.

The lines 12 to 15 represent conditions for controlling the transmission powers of the respective BTS1 and BTS2. The line 13 represents that the transmission power of the down link of the BTS1 is controlled to change from −20 dBm to −40 dBm by 2 dB/step.

In the same manner, the line 14 represents that the transmission power of the down link of the BTS2 is controlled to change from −40 dBm to −20 dBm by 2 dB/step. The line 15 represents that the transmission powers of the down links of the respective BTS1 and BTS2 are changed one step at intervals of 1 second.

The lines 16 to 17 represent the setting of a measurement function of neighbor cells. This function is not needed for this test. The set value of "OFF" represents the measurement is not performed.

Each line following at the Time Stamp=00:06:52 represents that the transmission power of the down link of the BTS1 is controlled to change by 2 dB/step. These integrally represent preliminary control phase for setting −20 dB to the transmission power of the down link of the BTS1 to start this test.

The cell reselection test operation is operated in accordance with the test subject specified by the operation section 18. FIG. 4 shows one example of the cell reselection test operation in case that the test subject is specified by the operation section 18 to execute the processes of: setting the BTS1 as the BTS A; setting the BTS2 as the BTS B; executing the cell reselection test from the BTS A to the BTS B; setting the BTS1 as the BTS C; and executing the cell reselection test from the BTS B to the BTS C.

When the test subject is specified by the operation section 18, the test process information corresponding to the specified test subject is obtained by the test process executing section 17 from the test process information storage 16. The test process executing section 17 operates on the basis of the obtained test process information.

The base transceiver station information setting section 14 is firstly controlled by the test process executing section 17 to obtain the base transceiver station information of the BTS A from the base transceiver station information storage 13, and to set the obtained base transceiver station information to the BTS1, in the step S21.

The base transceiver station information setting section 14 is then controlled by the test process executing section 17 to obtain the base transceiver station information of the BTS B from the base transceiver station information storage 13, and to set the obtained base transceiver station information to the BTS2, in the step S22.

The transmission status setting section 15 is then controlled by the test process executing section 17 to set the transmission power of the BTS1 to the level capable of communicating with the mobile terminal 2, in the step S23. The position registration is then performed by the mobile terminal 2 with targeting to the BTS1.

The transmission status setting section 15 is then controlled by the test process executing section 17 to have the BTS1 take the barred state, in the step S24. The determining condition indicated by the determining condition information stored in the determining condition information storage 19 is then determined by the determining section 20 to be met or not, in the step S25. In this embodiment, the determining condition represents that the position registration is performed by the mobile terminal 2 with targeting to the BTS2.

In case that the position registration is not performed by the mobile terminal 2 with targeting to the BTS2, the determining section 20 outputs the result to the outputting section 21 about the fact that the cell reselection test from the BTS A to the BTS B is failed, in the step S26, and the cell reselection test operation is ended.

Meanwhile, in case that the position registration is performed by the mobile terminal 2 with targeting to the BTS2, the base transceiver station information setting section 14 is then controlled by the test process executing section 17 to obtain the base transceiver station information of the BTS C from the base transceiver station information storage 13, and to set the obtained base transceiver station information to the BTS1, in the step S27.

The transmission status setting section 15 is then controlled by the test process executing section 17 to have the BTS2 take the barred state, in the step S28. The determining condition indicated by the determining condition information stored in the determining condition information storage 19 is then determined by the determining section 20 to be met or not, in the step S29. In this embodiment, the determining condition represents that the position registration is performed by the mobile terminal 2 with targeting to the BTS1.

In case that the position registration is not performed by the mobile terminal 2 with targeting to the BTS1, the determining section 20 outputs the result to the outputting section 21 about the fact that the cell reselection test from the BTS A to the BTS B is failed, in the step S26, and the cell reselection test operation is ended.

Meanwhile, in case that the position registration is performed by the mobile terminal 2 with targeting to the BTS1, the determining section 20 outputs the result to the outputting section 21 about the fact that the cell reselection test from the BTS A to the BTS C via the BTS B is successful, in the step S30, and the cell reselection test operation is ended.

When each process of the test subject specified by the operation section 18 is executed as described above, the result of each process is displayed as the log information by the outputting section 21.

In the present invention, the transmission status setting section 15 may control the test process executing section 17 to increase gradually the transmission power of the BTS2 with decreasing gradually the transmission power of the BTS1 without controlling the BTS1 to take the barred state, in the step S24.

In the same manner, the transmission status setting section 15 may control the test process executing section 17 to increase gradually the transmission power of the BTS1 with decreasing gradually the transmission power of the BTS2 without controlling the BTS2 to take the barred state, in the step S28.

In the present invention, the transmission status setting section 15 may control the test process executing section 17 to take the transmission power of the BTS2 to the level capable of communicating with the mobile terminal 2 under the transmission power of the BTS1, in the step S23, and to maintain the transmission power of the BTS2 with decreasing gradually the transmission power of the BTS1 without controlling the BTS1 to take the barred state, in the step S24.

Otherwise, the transmission status setting section 15 may control the test process executing section 17 to maintain the transmission power of the BTS1 with increasing gradually the transmission power of the BTS2 without controlling the BTS1 to take the barred state, in the step S24.

In the same manner, the transmission status setting section 15 may control the test process executing section 17 to maintain the transmission power of the BTS1 with decreasing gradually the transmission power of the BTS2 without controlling the BTS2 to take the barred state, in the step S28.

Otherwise, the transmission status setting section 15 may control the test process executing section 17 to maintain the transmission power of the BTS2 with increasing gradually the transmission power of the BTS1 without controlling the BTS2 to take the barred state, in the step S28.

As will be seen from the foregoing description, it is to be understood that the preferred embodiment of the mobile terminal tester 1 according to the present invention is designed to set the base transceiver station information and the transmission status to the base transceiver station simulators 10, 11 in each process of the test as needed, resulting in the fact that each base transceiver station simulator 10, 11 can simulate the plural base transceiver stations. The mobile terminal tester 1 can, therefore, reduce the production cost from that of the conventional mobile terminal tester.

It has been described in the forgoing embodiment about the fact that the base transceiver station information, the test process information and the determining condition information are preliminarily stored in the base transceiver station information storage 13, the test process information storage 16 and determining condition information storage 19, respectively. However, the mobile terminal tester 1 may be designed to store each kind of information to each storage 13, 16, 19 via the operation section 18 according to the present invention. Furthermore, the mobile terminal tester 1 may be designed to edit each kind of information stored in each storage 13, 16, 19 via the operation section 18 according to the present invention.

The mobile terminal tester 1 may be designed to store each kind of information in each storage 13, 16, 19 from an external device such as a computer via an interface module (not shown in the figures) according to the present invention. The mobile terminal tester 1 may be also designed to store each kind of information in each storage 13, 16, 19 from a memory media such as a memory card held into a slot member (not shown in the figures) according to the present invention.

While it has been described in the forgoing embodiment about the fact that the outputting section 21 is constituted by the display device, the outputting section 21 may be constituted by a storage media such as the hard disk device and the flash memory, an interface module for connecting an external device such as a computer and a printer, or a slot member for holding a removable memory media such as the memory card.

It has been described in the forgoing embodiment about the handover test operation of the mobile terminal tester 1 to execute the handover test for simulating the situation that the mobile terminal 2 sequentially moves through the communication areas of the respective BTSs A, B and C with reference to FIG. 2. However, the mobile terminal tester 1 can execute the test whether or not the mobile terminal 2 can operate the desired handover operation with moving through the communication areas of more base transceiver stations by storing the base transceiver station information of more base transceiver stations such as, for example, the BTSs D, E, F and G in the base transceiver station information storage 13 according to the present invention.

Furthermore, the mobile terminal tester 1 can execute the test of the stability of the mobile terminal 2 for the repeated handover operation by the test process executing section 17 executing the test subject stored in the test process information storage 16 for simulating the situation that the mobile terminal 2 repeatedly moves through the communication area of each base transceiver station as the BTSs A, B, C, A, B, C, A, B, C according to the present invention.

Figure 4:
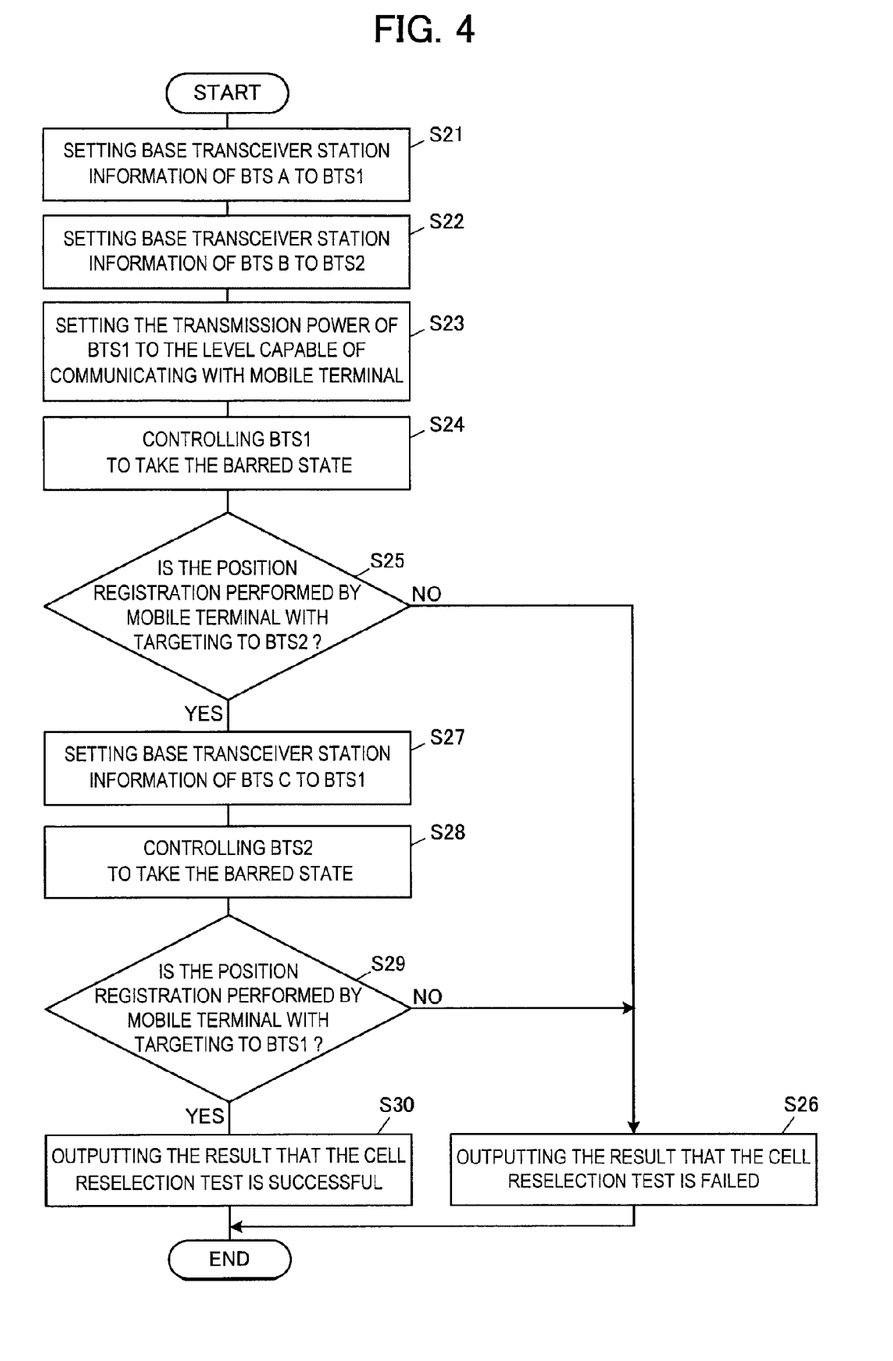
FIG. 4 is a flow chart showing a cell reselection test operation of the preferred embodiment of the mobile terminal tester according to the present invention.

It has been described in the forgoing embodiment about the cell reselection test operation of the mobile terminal tester 1 to execute the cell reselection test for simulating the situation that the mobile terminal 2 sequentially moves through the communication areas of the respective BTSs A, B and C with reference to FIG. 4. However, the mobile terminal tester 1 can execute the test whether or not the mobile terminal 2 can operate the desired cell reselection operation with moving through the communication areas of more base transceiver stations by storing the base transceiver station information of more base transceiver stations such as, for example, the BTSs D, E, F and G in the base transceiver station information storage 13 according to the present invention.

Furthermore, the mobile terminal tester 1 can execute the test of the stability of the mobile terminal 2 for the repeated cell reselection operation by the test process executing section 17 executing the test subject stored in the test process information storage 16 for simulating the situation that the mobile terminal 2 repeatedly moves through the communication area of each base transceiver station as the BTSs A, B, C, A, B, C, A, B, C according to the present invention.

What is claimed is:

1. A mobile terminal tester comprising:
   a first base transceiver station simulator and a second base transceiver station simulator for respectively simulating base transceiver stations by exchanging signals with a mobile terminal to be tested;
   a test process information storage for preliminarily storing therein test process information indicative of each process of a test of said mobile terminal in units of a test subject, said test of said mobile terminal being said test for simulating a situation that the mobile terminal sequentially moves through a communication area of a first base transceiver station, a communication area of a second base transceiver station, and a communication area of a third base transceiver station;
   a base transceiver station information storage for preliminarily storing therein a first type of base transceiver station information for simulating said first base transceiver station, a second type of base transceiver station information for simulating said second base transceiver station, and a third type of base transceiver station information for simulating said third base transceiver station;
   a base transceiver station information setting section for setting either one of said first type of base transceiver station information, said second type of base transceiver station information and said third type of base transceiver station information, respectively to said first base transceiver station simulator and said second base transceiver station simulator;
   a transmission status setting section for setting transmission status of said first base transceiver station simulator and said second base transceiver station simulator;
   a test process executing section for executing each process of a test of said mobile terminal by controlling said base transceiver station information setting section and said transmission status setting section; and
   a determining section operative to determine test results of said mobile terminal, in which
   said test process executing section is operative to execute said processes which includes:
   controlling said base transceiver station information setting section to set said first type of said base transceiver station information to said first base transceiver station simulator;
   controlling said base transceiver station information setting section to set said second type of said base transceiver station information to said second base transceiver station simulator;
   controlling said transmission status setting section to set said transmission status of said first base transceiver station simulator to ensure that said mobile is capable of communicating with said first base transceiver station simulator;
   controlling said transmission status setting section to set said transmission status of at least one of said first and second base transceiver station simulators to ensure that said mobile terminal is capable of communicating with said second base transceiver station simulator, after said mobile terminal and said first base transceiver station simulator are connected with each other;
   controlling said base transceiver station information setting section to set said third type of said base transceiver station information to said first base transceiver station simulator, after said determining section determines that said mobile terminal and said first base transceiver station simulator are disconnected and said mobile terminal and said second base transceiver station simulator are connected; and
   controlling said transmission status setting section to set said transmission status of at least one of said first and second base transceiver station simulators to ensure that said mobile terminal is capable of communicating with said first base transceiver station simulator.

2. A mobile terminal tester as set forth in claim 1, in which said test process executing section is operative to execute said processes which include:
   controlling said transmission status setting section to decrease gradually said transmission power of said first base transceiver station simulator with increasing gradually said transmission power of said second base transceiver station simulator, after said mobile terminal and said first base transceiver station simulator are connected with each other; and
   controlling said transmission status setting section to increase gradually said transmission power of said first base transceiver station simulator with decreasing gradually said transmission power of said second base transceiver station simulator, after controlling said base transceiver station information setting section to set said third base transceiver station information to said first base transceiver station simulator.

3. A mobile terminal tester as set forth in claim 1, in which said test process executing section is operative to execute said processes which include:
   controlling said transmission status setting section to have said first base transceiver station simulator to take said barred state, after said mobile terminal and said first base transceiver station simulator are connected with each other; and
   controlling said transmission status setting section to have said second base transceiver station simulator to take said barred state, after controlling said base transceiver station information setting section to set said third base transceiver station information to said first base transceiver station simulator.

4. A mobile terminal test method with using a mobile terminal tester having a first base transceiver station simulator and a second base transceiver station simulator for respectively simulating base transceiver stations by exchanging signals with a mobile terminal to be tested,
   said mobile terminal test method including:
   a test process information storing step for preliminarily storing test process information indicative of each process of a test of said mobile terminal in units of a test subject, said test of said mobile terminal being said test for simulating a situation that said mobile terminal sequentially moves through a communication area of a first base transceiver station, a communication area of a second base transceiver station, and a communication area of a third base transceiver station; and
   a base transceiver information storing step for preliminarily storing a first type of base transceiver station information for simulating said first base transceiver station, a second type of base transceiver station information for simulating said second base transceiver station, and a third type of base transceiver station information for simulating said third base transceiver station;

a test process executing step for executing said test subject based on said test process information, said test process executing step includes:

a first base transceiver station information setting step for setting said first type of said base transceiver station information to said first base transceiver station simulator;

a second base transceiver station information setting step for setting said second type of said base transceiver station information to said second base transceiver station simulator;

a first transmission status setting step for setting said transmission status of said first base transceiver station simulator to ensure that said mobile is capable of communicating with said first base transceiver station simulator;

a second transmission status setting step for setting said transmission status of at least one of said first and second base transceiver station simulators to ensure that said mobile terminal is capable of communicating with said second base transceiver station simulator, after said mobile terminal and said first base transceiver station simulator are connected with each other;

a determination step for determining that said mobile terminal and said first base transceiver station simulator are disconnected and said mobile terminal and said second base transceiver station simulator are connected;

a third base transceiver station information setting step for setting said third type of said base transceiver station information to said first base transceiver station simulator, after said determination step determined that said mobile terminal and said first base transceiver station simulator are disconnected and said mobile terminal and said second base transceiver station simulator are connected; and a third transmission status setting step for setting said transmission status of at least one of said first and second base transceiver station simulators to ensure that said mobile terminal is capable of communicating with said first base transceiver station simulator.

5. A mobile terminal test method as set forth in claim 4, in which said second transmission status setting step includes decreasing gradually said transmission power of said first base transceiver station simulator with increasing gradually said transmission power of said second base transceiver station simulator; and said third transmission status setting step includes increasing gradually said transmission power of said first base transceiver station simulator with decreasing gradually said transmission power of said second base transceiver station simulator.

6. A mobile terminal test method as set forth in claim 4, in which said second transmission status setting step includes having said first base transceiver station simulator to take said barred state; and said third transmission status setting step includes having said second base transceiver station simulator to take said barred state.

* * * * *